Figure 1:
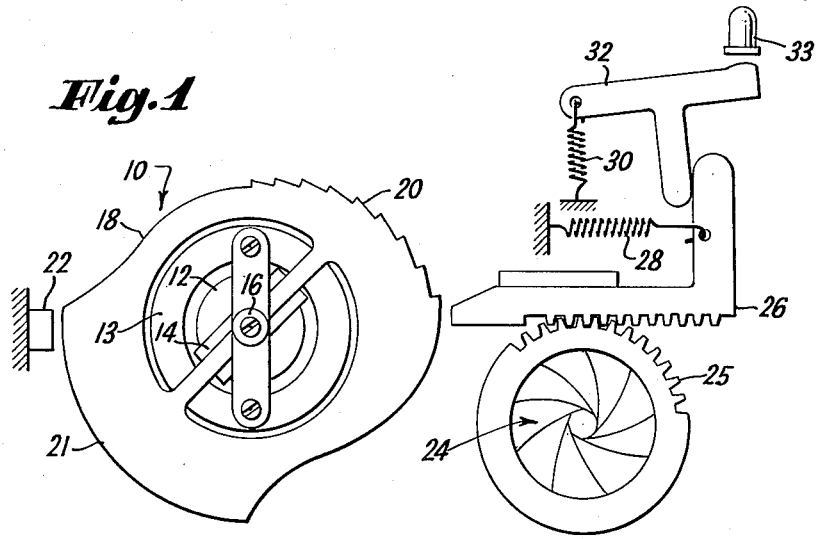

May 29, 1962  DE LOY H. KELLY ETAL  3,036,505
CAMERA
Filed July 31, 1959  4 Sheets-Sheet 1

INVENTORS
JAN A. VAN DEN BROEK
DELOY H. KELLY
BY
ATTORNEY

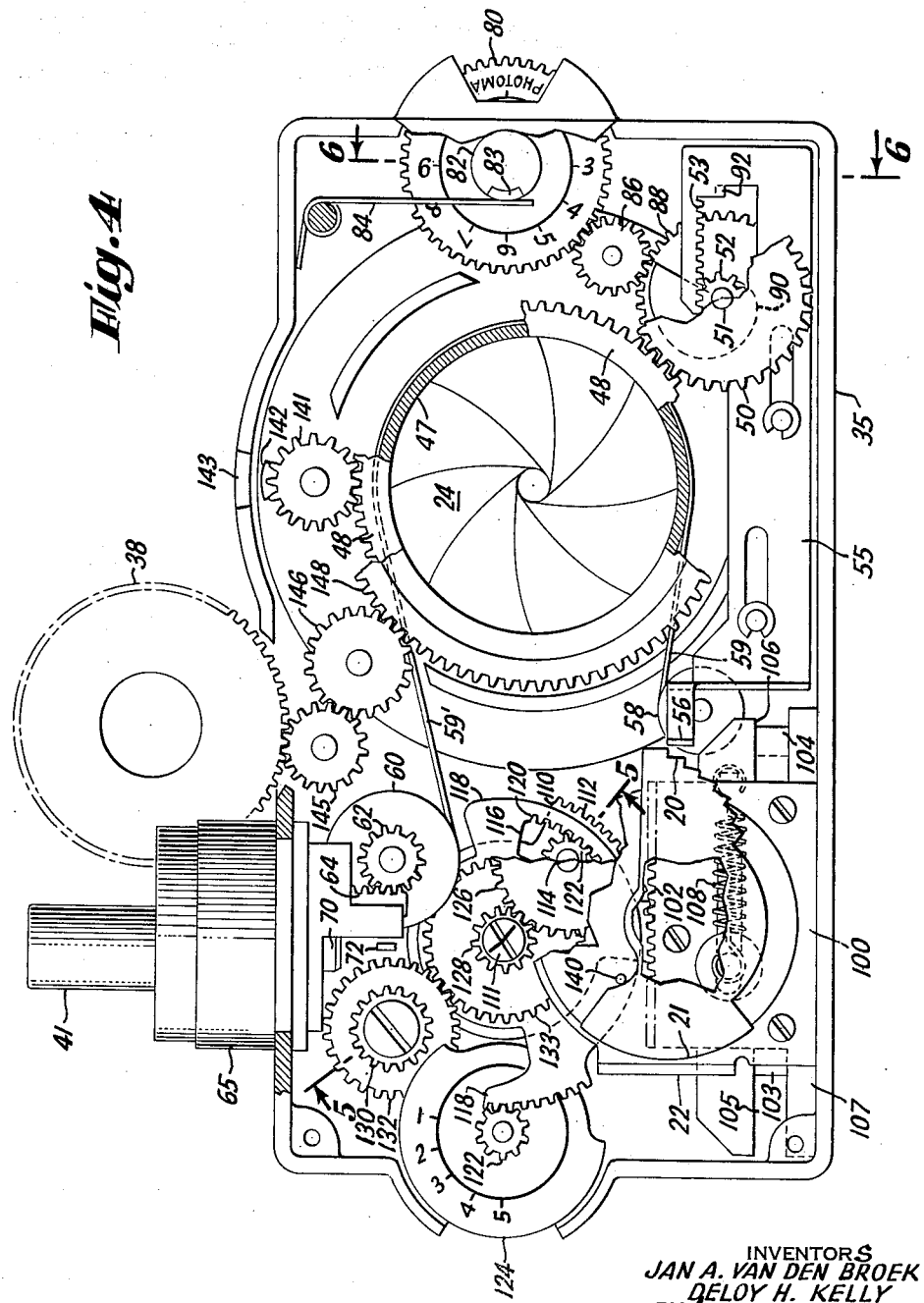

May 29, 1962 DE LOY H. KELLY ETAL 3,036,505
CAMERA
Filed July 31, 1959 4 Sheets-Sheet 3
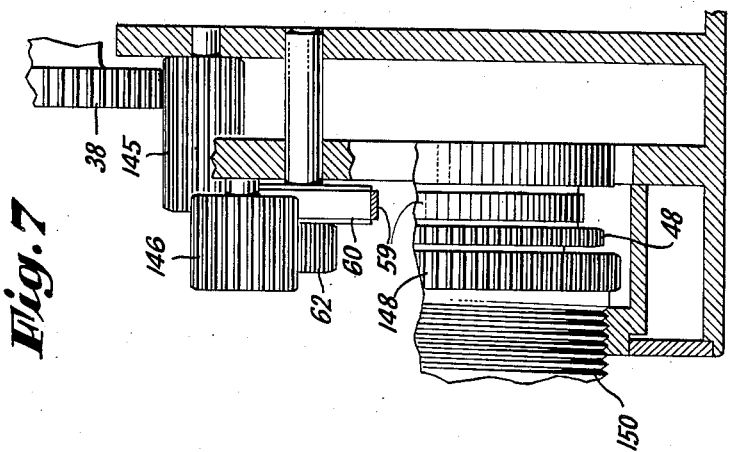
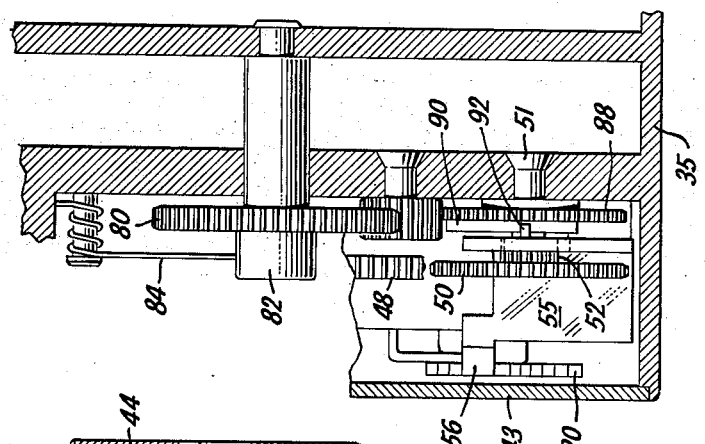
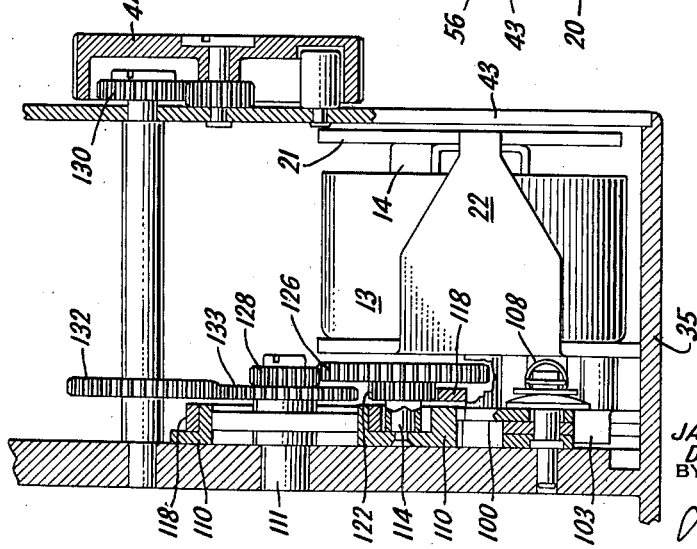
INVENTORS
JAN A. VAN DEN BROEK
DELOY H. KELLY
BY
ATTORNEY May 29, 1962 DE LOY H. KELLY ETAL 3,036,505
CAMERA
Filed July 31, 1959 4 Sheets-Sheet 4
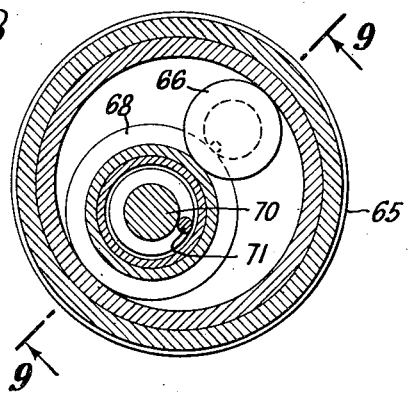
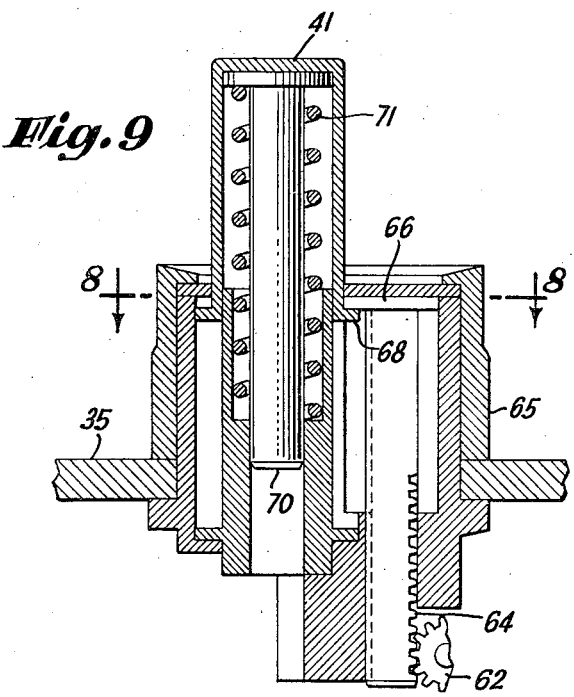
INVENTORS
JAN A. VAN DEN BROEK
DELOY H. KELLY
BY
ATTORNEY

3,036,505
CAMERA
De Loy H. Kelly, Jackson, and Jan A. Van Den Broek, Ann Arbor, Mich., assignors to Sylvania Electric Products Inc., a corporation of Delaware
Filed July 31, 1959, Ser. No. 830,811
12 Claims. (Cl. 95—10)

The present invention relates to photographic cameras and, more particularly, to those in which an exposure factor is automatically so controlled by the average brightness of the scene being photographed that the film receives an optimum exposure regardless of how, within limits, this brightness changes from exposure to exposure. All such cameras with which we are familiar are provided with a scene brightness sensing element such as a photoelectric cell and means for translating the brightness information into a mechanical adjustment of either the camera shutter speed or the lens diaphragm, or both. Such cameras have used a photo-voltaic cell for the scene brightness sensing element and a microammeter for responding to the current generated by the photo-voltaic cell. Motion picture cameras utilizing small film areas and small diameter, short focus lenses have used the deflection of the microammeter to directly control diaphragm blades to adjust the exposure obtained. However, in cameras designed for use with larger film, the focal length of the lenses in the camera must be correspondingly increased and for high speed lenses the diaphragm aperture and its range of adjustment becomes so large that the degree of movement required and the size of the parts makes it impractical, as far as we are aware, to utilize the microammeter to directly contol the diaphragm aperture.

On the other hand, mechanisms with which we are familiar, operating by mechanically sensing the meter deflection and controlling or indirectly affecting a suitable camera adjustment, have had one or more of the following disadvantages. The meter movement may be subject to excessive shock or strain which impairs its accuracy, the mechanism may operate only in a limited number of positions thus limiting the accuracy of the device as an exposure computer or the meter sensing means has been so complex or fragile that it will not long stay in adjustment.

An object therefore of the present invention is to overcome the above mentioned disadvantages.

Another object of the present invention is the provision of an automatic exposure control mechanism for a camera which will directly adjust the exposure diaphragm in accordance with a number of factors fed into the mechanism, one of which is proportional to the amount of light falling upon the scene to be photographed while others may be proportional to the shutter speed and film speed.

Still another object of the present invention is to provide a mechanism as aforesaid which may be adjusted to take care of different film speeds and shutter speeds automatically.

The foregoing objects and others which may appear from the following detailed description are attained in accordance with principles of our invention by incorporating into a photographic camera assembly, a photo-voltaic cell arranged to receive light from substantially the same angle as the photographic objective, a microammeter movement coupled to said cell, the armature of such movement carrying a cam having one stepped face and directly opposite thereto a face of constant height. The camera is provided with an iris diaphragm, spring-biased toward one end of its range of adjustment so that the diaphragm normally rests at the said end of its range of adjustment. Mechanism is provided, coupled to the shutter release mechanism so that as the shutter release button is pressed, resilient means drive the diaphragm toward the other end of its range of adjustment carrying with it a feeler finger arranged to contact the stepped cam face. As the feeler member contacts one of the steps of the cam the diaphragm movement is arrested at a particular aperture determined by the particular step of the cam which is contacted. In order to prevent the pressure of the cam feeler member from straining the microammeter movement or its pivots, a fixed stop is arranged closely adjacent to the face of the cam of constant height. Thus only a very slight displacement of the cam by the feeler member brings the constant height cam face against the fixed stop and prevents excessive displacement of the microammeter armature. Continued movement of the shutter release after the diaphragm has reached its adjusted position then actuates the shutter allowing the picture to be taken in the usual manner.

As a further feature of the present invention, means are provided for shifting the micrommater movement as a whole and fixed stop along the path of movement of the cam feeler finger to adjust for different film speeds and shutter speeds. Furthermore, since there may be instances when the operator of the camera may wish to use a different exposure than the one determined by the action of the photo-voltaic cell, we have provided means for disabling the photoelectric cell and for manually adjusting a second cam stop so that as the diaphragm is released for movement over its range of adjustment away from its position of rest the manual cam stops the diaphragm at the predetermined aperture setting.

It is known that a suitably exposed picture results if the diaphragm aperture is adjusted to satisfy the following equation: $A=\sqrt{TBS}$, where A is the aperture in conventional $f$ numbers, T is exposure time in seconds, B is the scene brightness in candles per square foot and S is the A.S.A. exposure index of the film in use. However, this particular mathematical relationship presents some difficulties in setting the various factors into an automatic mechanism for controlling the aperture in accordance with the light received from the scene to be photographed. We have, therefore, chosen to calibrate the controls in simplified values, as follows:

The aperture $A_v=\log_2 A^2$; the exposure time $$T_v = \log_2 \frac{1}{T}$$

the exposure index $$S_v = \log_2 \frac{S}{10}$$

and the brightness $B_v=\log_2 10B$. When A, T and S have the meanings defined above with these calibrations a good exposure of the film results if the following equation is satisfied: $B_v+S_v=T_v+A_v$.

Now, since only simple addition and subtraction of the various factors are required, the exposure time $T_v$ and the exposure index $S_v$ can be fed into the mechanism by simple differential gearing laterally shifting the meter movement as a whole along the line of travel of the feeler finger which determines the aperture. The logarithmic relationship between the light falling on the photo-voltaic cell and the particular cam step selected by the rotation of the microammeter armature consequent thereto can readily be established by appropriate proportioning of the cam steps, a variation of the pole piece structure of the microammeter movement, or both.

Figure 3:
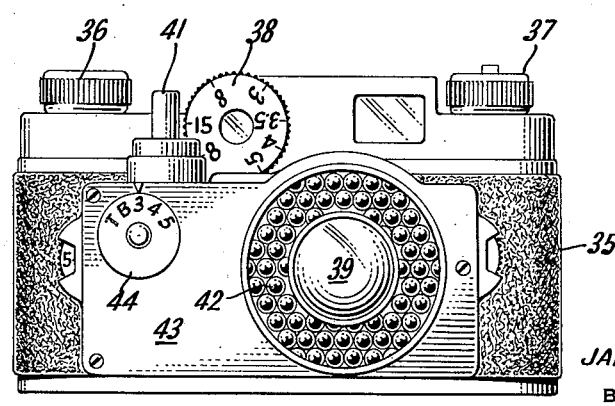

The invention will be more completely understood by reference to the following detailed description which is accompanied by a drawing in which FIGURE 1 illustrates in diagrammatic form an embodiment of the diaphragm setting structure of our invention, while FIG- URES 2a and 2b illustrate two views of a modification of a portion of the structure shown in FIGURE 1; FIGURE 3 illustrates in an elevation view a camera containing one embodiment of the present invention; FIGURE 4 illustrates a portion of the camera of FIGURE 3 with the face plate, the shutter speed knob and the photocell and lens removed so that details of the interior construction can be more readily comprehended; FIGURE 5 is a section taken along line 5, 5 of FIGURE 4; FIGURE 6 is another section taken along line 6, 6 of FIGURE 4; FIGURE 7 is a view similar to FIGURE 6 but with portions broken away to show more clearly parts that are obscured in FIGURE 6, while FIGURES 8 and 9 are plan and vertical sectional views of the shutter release button.

FIGURE 1 is a simplified illustration of the diaphragm setting structure of an embodiment of our invention. It includes a microammeter 10 having a central permanent magnet core 12 and a surrounding annular yoke 13 producing a radial magnetic field in the gap between the yoke 13 and the core 12. An armature coil 14 surrounds core 12 with its sides immersed in the radial field and supported for rotation about the longitudinal axis of core 12 on pivots 16. Helical hair springs (not shown) at each pivot serve to conduct current to the coil and to urge armature 14 to a return to a normal position of rest. Though not so shown in this figure, it will be understood that a photo-voltaic cell is connected to the coil winding so that the current generated by the photo-voltaic cell flows through the coil. The coil, therefore, is rotated about its vertical axis against the torque of the hairsprings to a position determined by the strength of the current flowing through the coil. The armature also carries a dual faced cam 18 having a stepped face 20 and a semi-circular face 21 concentric with the moving coil axis. Thus, as the armature 14 and the cam 18 are rotated together cam face 21 always maintains a slight clearance from fixed stop 22. The adjusting ring of diaphragm 24 is provided with peripheral teeth 25 which mesh with teeth on rack 26 arranged for lateral motion along a line radial to the axis of coil 14 and cam 18. Rack 26 is normally urged toward said axis by the bias of spring 28. The bias is normally overcome by spring 30 which maintains shutter release lever 32 in its most counter-clockwise position of rotation. Now as shutter release button 33 is pressed, causing the shutter release lever 32 to be rotated clockwise against the tension of spring 30, rack 26 is urged to the left by the action of spring 28 until it contacts one of the steps of stepped cam face 20. The pressure of rack 26 against stepped cam 20 might tend to distort the moving coil 14 or its pivot structure if it were not for the presence of fixed stop 22 which is contacted by the semi-circular portion 21 of cam 18, which prevents excessive lateral movement of the cam. The cam is, in effect, pinched between the fixed stop 22 and the end of rack 26, and rigidly held before any excessive deflection of the meter pivots occurs. Continued pressure on the shutter release button 33 causes the shutter release lever 32 to move away from the finger on rack 26 as in a lost motion mechanism. It finally reaches a position in which the shutter is tripped and the picture is exposed.

The shutter mechanism and the shutter trip mechanism, aside from the lever 32, is conventional in the art and is therefore not shown in this figure.

Figures 2A, 2B:
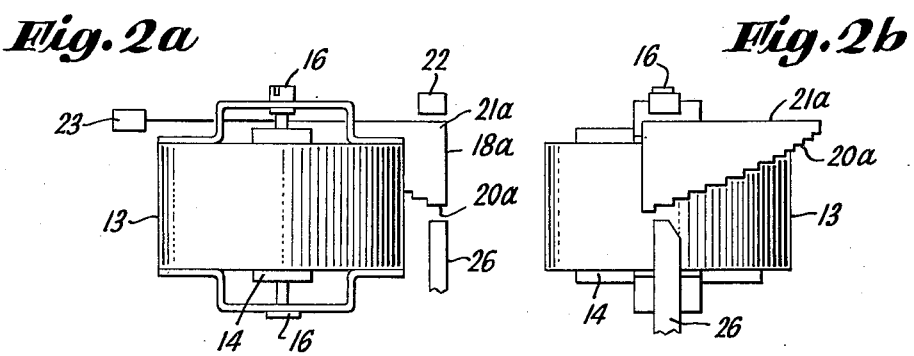

In FIGURES 2a and 2b we have shown a modification of the meter and cam structure of FIGURE 1 which, under some circumstances, may be preferable. Parts in these figures which have exactly the same structure and operation as in FIGURE 1 bear the same reference numerals.

In these figures cam 18a is in the form of a hollow cylindrical section having a stepped end face 20a and opposed thereto a flat end face 21a. Since cam 18a is not symmetrical about the axis of rotation suitable counterweights 23 are provided to balance the moving elements so that external accelerations cause no movement. Similar balancing means may be used with cam 18 of FIGURE 1 if necessary. Aside from the fact that the axis of the meter movement for the modification of FIGURES 2a and 2b must be mounted at right angles to that of FIGURE 1 and the feeler finger of rack 26 operates along the line parallel to the axis of the meter movement, the operation is similar to that just described for FIGURE 1, and will be clearly understood without additional description.

FIGURE 3 shows a photographic camera embodying the exposure control mechanism of the present invention and having the conventional body 35, shutter and film winding knob 36, film rewind 37, focussing gear 38, objective 39, and shutter release button 41. The photoelectric cell 42 is responsive to the light falling thereon from the scene viewed by objective 39. We have found it convenient to arrange photoelectric cell 42 as a toroidal body surrounding the objective 39, though other arrangements and locations of the photoelectric cell may be used if desired. Cover plate 43, carrying knob 44 for controlling the shutter speed, in FIGURE 3 covers the interior mechanism which is shown in more detail in FIGURE 4.

In this figure diaphragm 24 is caused to open and close by the rotation of ring 47 arranged concentric therewith and having gear teeth 48 on its rim. Gear teeth 48 mesh with a gear wheel 50 journaled on bearing 51. Rigidly attached to gear 50 for simultaneous rotation therewith is a second gear 52 meshing with a rack 53 carried by laterally shiftable bar 55 which carries cam feeler finger 56. As ring 47 is rotated in one direction it opens diaphragm 24 and as it is rotated in the other direction it closes it. Through gear teeth 48, gear wheels 50 and 52, and rack 53, rotation of ring 47 causes feeler finger 56 to approach or recede from cam face 20 just as described above with reference to FIGURE 1.

The resilient force tending to urge the leaves of diaphragm 24 into an open position is provided by a band spring 59 wrapped about spring drum 58, thence in a counter-clockwise direction around diaphragm ring 47 and connected thereto. The spring has a continuing flexible ribbon portion 59' which extends to and is finally connected to drum 60. If drum 60 is released at least for a limited degree of counter-clockwise rotation, band spring 59 tends to wrap around spring drum 58 thus rotating diaphragm ring 47 in a clockwise direction whilst through gears 50, 52 and rack 53, member 55 is drawn to the left until feeler finger 56 encounters one of the steps of cam 20. Thus diaphragm 24 is adjusted to a particular aperture dependent upon the position of cam 20 and this in turn is determined by the amount of light falling on photocell 42 (FIG. 3).

The manner in which drum 60 is released for rotation so that the diaphragm may be adjusted will now be explained, partly with reference to FIGURE 4 and partly with reference to FIGURE 9.

Drum 60 carries gear 62 journaled for rotation therewith which meshes with rack 64. Rack 64 is mounted for sliding motion within housing 65 of the shutter release mechanism. At its upper end it carries a lip 66 engaging with lip 68 on the lower end of shutter release button 41. Button 41 is hollow and carries a coaxial central shaft 70. It is maintained in its extreme upper position by coil spring 71. As the shutter release button is pressed downwardly lip 68 also moves downwardly releasing rack 64 for downward travel. This allows gear 62 and drum 60 attached thereto to rotate in a counter-clockwise direction under the urging of spring drum 58. As soon as the diaphragm has thereby been released to open to the extent determined by cam 20, rack 64 ceases its downward motion. Shutter release button 41 and its central coaxial shaft 70 continue their downward operation until shaft 70 contacts shutter release lever 72 (FIG. 4) which protrudes from within the camera body into the path of shaft 70. Thus it will be seen that the first portion of the movement of shutter release button 41 releases the diaphragm control mechanism for setting the diaphragm to an appropriate aperture and continued motion thereafter causes the shutter trip lever 72 to trip the shutter making the exposure.

It will be further apparent that spring 71 for the shutter release button 41 acts not only to maintain diaphragm 24 in a closed position when the camera is not in use but also releases the cam feeler finger 56 from the meter cam 20. This allows cam 20 to turn freely at all times except when an exposure is actually being made thus metering the brightness level at all times, except at the very moment when the release button 41 is depressed.

It should further be noted that while diaphragm 24 is rotating to the appropriate aperture as determined by the cam the band spring 59 opposes the upward force of the release button spring 71. Thus only a relatively small downward force is required on the release button 41 in order to set the diaphragm operating mechanism into operation.

However, when the diaphragm has opened to its proper position the effect of band spring 59 on the shutter release button 41 is lost and added downward force is needed to continue the travel of release button 41 to trip the shutter. This enables the operator of the camera to selectively operate the aperture setting function of the camera one or more times without necessarily tripping the shutter. Thus if he should start to take a picture under one condition of light and change his mind before the shutter has actually been released and moved to a different position requiring a different aperture setting the camera can adjust itself for such different aperture setting without wasting an exposure of the film, as might occur if there was not a definite difference in resistance on the shutter release button between the two functions.

Now assume that the operator of the camera wishes to take a picture at a different diaphragm aperture than that which would be automatically selected. This may be accomplished by the means now to be described. At the extreme right hand edge of FIGURE 4 is a dial 80 bearing gear teeth on its periphery and having inscribed at one portion with a descriptive legend such as "photomatic." It is in this position that the automatic operation of the camera takes place. Dial 80 also carries commutator 82 having an insulated segment 83 therein. In the "photomatic" position of dial 80, spring 84 bears against the insulated segment and spring 84 is therefore ungrounded. Connections (not shown) from spring 84 and the camera body are wired across photocell 42. The dial 80 also carries numerical calibrations representative of different diaphragm openings and when dial 80 is turned to any of these positions spring 84 bears against a conducting portion of commutator 82 and short circuits photocell 42. Thus cam 20 will always remain in a position representative of the widest opening of the diaphragm 24 so that no possible setting of the diaphragm by the manual means can be interfered with by cam 20. Meshing with the gear teeth on the dial 80 is a gear 86 which in turn engages with gear 88 concentric with gears 48 and 52. Gear 88 has rigidly attached thereto a cam 90 which is adapted to be contacted by stop 92 on slider 55. As dial 80 is rotated to bring one of the numerical designations opposite the index mark, gear 88 and cam 90 are rotated so that a preselected portion of the cam surface of cam 90 is in line with finger 92. Now when the shutter release is pressed as described above, diaphragm operating ring 47 is again rotated in a clockwise direction, slider 55 moves to the left until finger 92 contacts the surface of cam 90. This stops the diaphragm in a position corresponding to the relative aperture number selected on disc 80.

In FIGURE 4, meter movement 10 is mounted on a support plate 100 having rack teeth 102 along its upper edge and downwardly extending tabs 103 and 104 riding in guide slots 105 and 106, respectively, in track 107. Thus the meter movement and its supporting plate 100 can be laterally shifted along track 107 as desired. It is normally urged to one end of its range of travel by spring 108. This lateral shifting of the meter movement as a whole provides for adjusting the camera for different film speeds and shutter speeds. Sector gear 110 journaled on shaft 111 has teeth 112 along a portion of its periphery adapted to engage with rack 102 on the meter base plate 100. A pivot 114 is rigidly mounted on sector gear 110 and passes through an aperture 116 in second sector gear 118 also journaled on bearing 111. Internal gear teeth 120 are provided along one edge of aperture 116 in second sector gear 118 which mesh with a pinion 122 journaled on pivot 114. Sector gear 118 also meshes with pinion 122 carried by dial 124 which bears numerical indicia representative of different film speeds. Thus, if one assumes for the moment that pinion 122 is held rigid as dial 124 is rotated, second sector gear 118 will carry first sector gear 110 along with it. Gear teeth 110 meshing with rack 102 will shift the meter support 100 and the meter movement carried thereby laterally to the right or left. However, pinion 122 is not held rigid but rather is rigidly mounted to coaxially arranged gear 126 which, in turn, meshes with pinion 120 also journaled on bearing 111. The shutter speed control knob 44 of FIGURE 3 is geared to pinion 128 by means of gears 130, 132 and 133, the latter of which is coaxial with pinion 128 and is rigidly secured thereto.

Now for any particular setting of film speed dial 124 as the shutter speed control 44 is rotated, pinion 122 is caused to rotate through gear train 130, 132, 133, 128 and 126, thus progressing along the internal gear teeth 120 in second sector gear 118. This causes sector gear 110 to be shifted relative to sector gear 118 algebraically adding a movement to the right or left of meter base plate 110 to that caused by movement of film speed dial 124. Thus the operative position of meter movement 10 is determined by the algebraic addition of the positioning caused by film speed dial 124 and shutter speed dial 42. The rotation of cam 20 algebraically adds a factor proportional to the amount of light falling on the scene to be photographed while the movement of cam feeler finger 56 allows a sufficient motion of the diaphragm to satisfy the equation for proper exposure given earlier in the specification.

It should be noted that at high levels when the stepped cam 20 is in its most clockwise position it might be possible for the operator, in adjusting dial 124 or 44, to force the cam against the cam follower 56. This is prevented by pin 140 mounted to the body of the camera and cooperating with the upper edge of cam 21 to rotate the cam counter-clockwise far enough to prevent such action.

The present invention also contemplates provisions for warning the operator if the scene brightness is beyond the limits of adjustment of the diaphragm control. A warning signal for these conditions is provided by gear 141 meshing with diaphragm ring gear 148 and bearing a distinctively colored sector 142 visible in window 143 at the top of the case 35. The ratio of ring gear 148 and gear 141 is so chosen that sector 142 comes into view only at each end of the range of movement of diaphragm 24.

If the operator, while directing the camera at the scene to be photographed, depresses button 41 and the automatic diaphragm adjustment causes the sector 142 to become visible, he is thus warned to select a more suitable shutter speed before completing the exposure.

Though not a part of our present invention, the coupling between range finder gear 38 and the focussing movement of the lens barrel is accomplished by gear train 145 and 146 driving ring gear 148 concentric with the ring bearing gear teeth 48. Rotation of ring gear 148 moves the threaded lens barrel 150 toward and away from the film gate (not shown) within the camera. Of course, diaphragm 24 does not rotate as lens barrel 150 is rotated but rather only moves in or out with the barrel so that it always remains at the optical center of lens 39.

We claim:
1. A camera having an adjustable diaphragm, bias means normally urging said diaphragm toward a position of maximum opening, said camera having a shutter release, resilient means under control of said shutter release acting in opposition to said bias means for urging said diaphragm to a position of minimum opening, a motor operated cam, and a cam follower coupled to said diaphragm and operatively arranged with respect to said cam whereby the extent of motion of said diaphragm toward its maximum opening is controlled in dependence upon th position of said cam, the operation of said shutter release acting to disable said resilient means.

2. A camera having an adjustable diaphragm, bias means normally urging said diaphragm toward a position of maximum opening, said camera having a shutter release button, resilient means under control of said shutter release acting in opposition to said bias means to urge said diaphragm to a position of minimum opening, a motor operated cam, and a cam follower coupled to said diaphragm and operatively arranged with respect to said cam to control the extent of motion of said diaphragm toward its maximum opening in dependence upon the position of said cam, means for disabling said resilient means in response to operation of said shutter release button, said cam having a stepped portion adjacent said cam follower and a portion of constant height opposite said follower and stationary stop means adjacent said portion of constant height whereby lateral movement of said cam caused by pressure of said follower against said cam is prevented by said stationary stop.

3. A camera as set forth in claim 2 wherein said cam is a flat plate having diametrically opposed circular and stepped portions, said follower and said fixed stop being diametrically opposed.

4. A camera as set forth in claim 2 wherein said cam is a flat plate having diametrically opposed circular and stepped portions, said follower and said fixed stop being diametrically opposed, said cam being carried by an armature of said motor and said armature and cam being balanced to be non-responsive to external accelerations.

5. A camera as set forth in claim 2 wherein said cam is a cylindrical cam having linear and stepped faces axially opposing one another and said cam follower moves axially of said cam.

6. A camera as set forth in claim 2 wherein said cam is a cylindrical cam having linear and stepped faces axially opposing one another and said cam follower moves axially of said cam, said cam being carried by an armature of said motor and said armature and cam being balanced with respect to external accelerations.

7. A camera having an adjustable diaphragm, bias means normally urging said diaphragm towards a position of maximum opening, said camera having a shutter release, resilient means under control of said shutter release acting in opposition to said bias means for normally urging said diaphragm to a position of minimum opening, a motor operated cam, and a cam follower coupled to said diaphragm and operatively arranged with respect to said cam whereby the extent of motion of said diaphragm toward its maximum opening is controlled in dependence upon the position of said cam, said shutter release operating to disable said resilient means when said shutter release is operated, said cam having a stepped portion adjacent said cam follower and a portion of constant height opposite said follower, and stationary stop means adjacent said portion of constant height whereby excessive lateral movement of said cam caused by pressure of said follower against said cam is prevented by said fixed stop, means for simultaneously laterally shifting said cam and fixed stop along the line of motion of said cam whereby the aperture of said diaphragm selected by said cam may be adjusted for differing film speeds and shutter speeds.

8. A camera having an adjustable diaphragm, bias means normally urging said diaphragm toward a position of maximum opening, said camera having a shutter release, resilient means under control of said shutter release acting to overcome said bias means whereby said diaphragm is normally urged to a position of minimum opening, said shutter release disabling said resilient means when it is operated, a motor operated cam, and a cam follower coupled to said diaphragm and operatively arranged with respect to said cam whereby the extent of motion of said diaphragm toward its maximum opening is controlled in dependence upon the position of said cam when said resilient means are disabled by operation of said shutter release, said cam having a stepped portion adjacent said cam follower and a portion of constant height opposite said follower, and stationary stop means adjacent said portion of constant height whereby excessive lateral movement of said cam caused by pressure of said follower against said cam is prevented by said fixed stop, means for simultaneously laterally shifting said cam and fixed stop along the line of motion of said cam whereby the aperture of said diaphragm as determined by the position of said cam may be adjusted for differing film speeds and shutter speeds, said shifting means being coupled to shutter speed control means and film speed adjustment means of said camera.

9. A camera as set forth in claim 2 including a manually controllable second cam, a second cam follower in operative relationship with said second cam and carried by the first of said followers and means for disabling said motor when said second cam is moved from a predetermined position of rest whereby said second cam controls the opening of said diaphragm when said shutter release button is operated.

10. A camera as set forth in claim 2 including a manually controllable second cam, a second cam follower in operative relationship with said second cam and carried by the first of said followers and means for disabling said motor when said second cam is moved from a predetermined position of rest whereby said second cam controls the opening of said diaphragm when said shutter release button is operated, said disabling means including a commutator coupled to said second cam, a brush bearing against said commutator and an insulating segment in said commutator against which said brush rests when said second cam is in its position of rest and connections from said brush and said commutator to said motor.

11. In a camera having a variable diaphragm and a shutter release mechanism, means under control of said shutter release mechanism to urge said diaphragm toward an end position of rest when said shutter release mechanism is operated, said camera including an electric motor having a rotary armature adapted to be coupled to a photoelectric cell and carrying a rotary cam having a stepped cam face and circular face in diametrically opposed relationship, a fixed stop carried by said motor and closely adjacent said circular face, a cam follower normally out of contact with said stepped face and movable radially into contact therewith, and coupled to said diaphragm whereby the position of said cam controls the extent of movement of said diaphragm, and means for shifting said motor longitudinally along the line of motion of said cam follower.

12. A camera as set forth in claim 11 wherein said means for shifting said motor longitudinally along the line of said follower includes a toothed rack carried by said motor and a sector gear meshing with said toothed rack, a pair of input gears and differential gearing coupled between each of said input gears and said sector gear whereby said motor may be moved laterally a distance equal to the algebraic sum of the movement of said input gears, one of said input gears being coupled to shutter speed control mechanism of said camera and the other being coupled to a dial having calibrations proportional to various film speeds, the movement of said cam follower controlling the diaphragm aperture of said camera to set it proportionally to the light received by said photo cell, the speed of film and the shutter speed.

References Cited in the file of this patent

UNITED STATES PATENTS

| | | |
|---|---|---|
| 2,148,963 | Rauch | Feb. 28, 1939 |
| 2,252,573 | Leitz | Aug. 12, 1941 |
| 2,868,095 | Gebele | Jan. 13, 1959 |
| 2,906,166 | Herterich | Sept. 29, 1959 |
| 2,913,969 | Faulhaber | Nov. 29, 1959 |